United States Patent [19]

Morrissey et al.

[11] 3,724,271
[45] Apr. 3, 1973

[54] SPINNING RADIOSONDE CONFIGURATION

[75] Inventors: James P. Morrissey, Norwood; Donald J. MacDonald, Bedford, both of Mass.

[73] Assignee: The United States of America as represented by the Secretary of the Air Force

[22] Filed: Dec. 30, 1971

[21] Appl. No.: 213,932

[52] U.S. Cl. .................................................73/336
[51] Int. Cl. ..............................................G01w 1/08
[58] Field of Search .........73/336.5, 336, 335, 170 R; 325/113

[56] References Cited

UNITED STATES PATENTS

| 2,630,476 | 3/1953 | Zelov | 73/170 R |
| 3,014,369 | 12/1961 | Bohl | 73/170 R |
| 3,353,100 | 11/1967 | Collins | 325/113 |

Primary Examiner—S. Clement Swisher
Assistant Examiner—Denis E. Corr
Attorney—Harry A. Herbert, Jr. et al.

[57] ABSTRACT

A radiosonde is provided with a pair of opposite aerodynamic elements attached at an angle to the sides of the housing near the top causing the radiosonde to spin as it ascends. One of the attached elements includes a chamber which contains a humidity measuring means over which a stream of air is caused to flow at an increased rate as the spinning radiosonde ascends.

4 Claims, 2 Drawing Figures

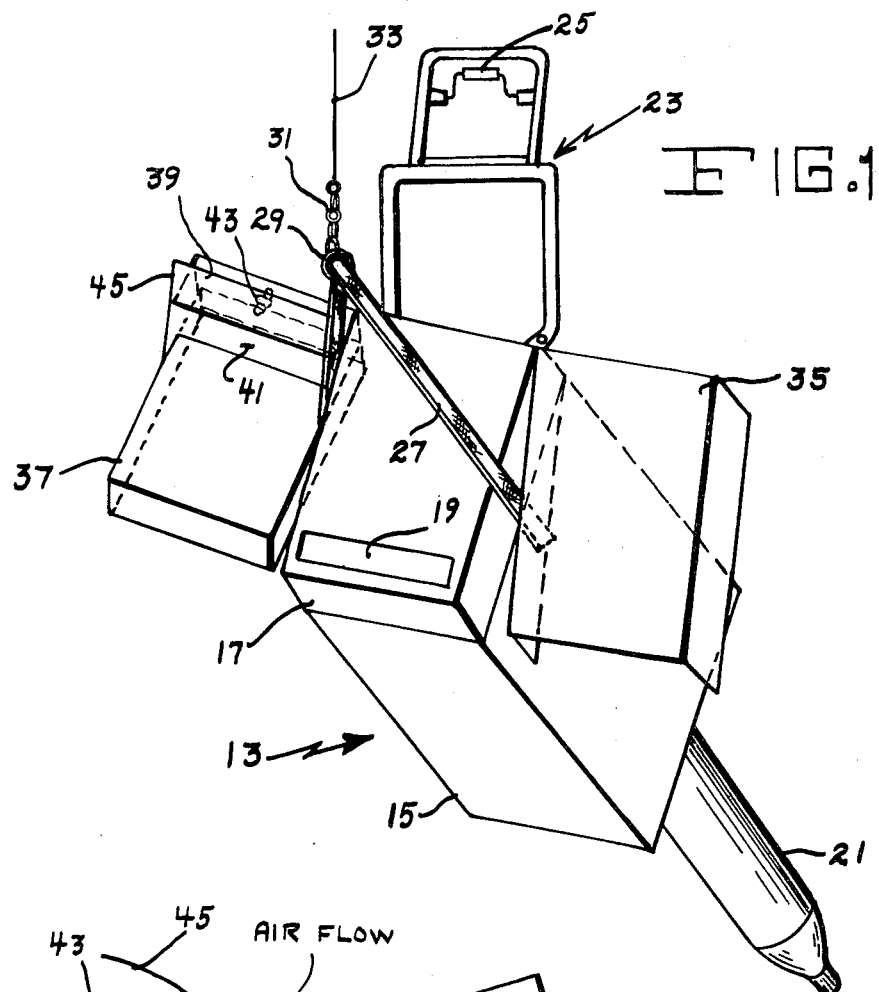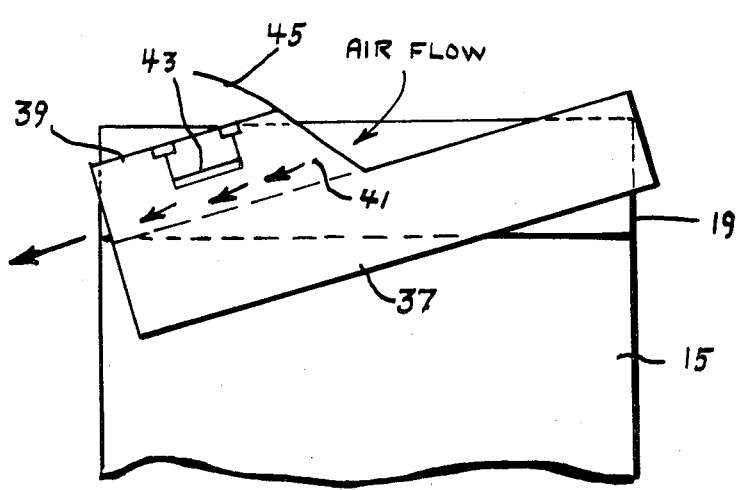

SPINNING RADIOSONDE CONFIGURATION

BACKGROUND OF THE INVENTION

This invention relates to an improved radiosonde instrument which is carried aloft by a balloon and, more particularly, the invention is concerned with providing a radiosonde with a more accurate humidity measuring capability by locating the sensor in one of a pair of wing-like aerodynamic elements which cause the radiosonde to spin during ascent and thereby increase the air flow over the sensor.

In presently known radiosondes of the type shown in U. S. Pat. No. 3,353,100 issued in the names of John W. Collins and Maurice Friedman, the measurement of relative humidity is carried out by positioning a sensor element in a duct in the top cover of the radiosonde. The cover has an intake opening at its rear top portion formed by a downwardly and forwardly deflected portion and sidewalls to form the duct. The forward end of the cover is open to provide an opening for the free passage of air to a sensitized plate which is held in the duct by spring clips. The sensitized plate is designed to measure the relative humidity of the air which passes through the duct.

However, there are certain factors which materially affect the accuracy of the readings obtained using the above described relative humidity measuring system. One of these factors is the temperature discrepancy between the sensing element and the ambient air. This is caused by the solar irradiation on the carbon humidity sensing element and on the cavity in which the element is housed. Even the small amount of solar energy which reaches the sensing element will raise the temperature enough to produce an incorrect lower relative humidity reading. This problem has been substantially corrected by blackening the sensor channel walls and is the subject of a co-pending patent application entitled "Humidity Measuring Instrument For Airborne Sensors," Frederick J. Brousaides and James F. Morrissey, inventors, Ser. No. 171,076 filed Aug. 12, 1971.

Another significant factor which materially affects the accuracy of the relative humidity readings is the direction and magnitude of the airflow through the humidity element duct or cavity. In order to produce a reading which more nearly approaches that of the ambient atmosphere, it is desirable to increase the ventilation rate and to provide an uncontaminated air sample. This requires an increased flow as well as a more stable flow of air and also requires a control over the direction of flow. The increased flow over the sensor would operate to increase the heat transfer and mass transfer coefficients and thus increase the accuracy and sensitivity of the relative humidity readings as the radiosonde ascends.

SUMMARY OF THE INVENTION

The present invention provides an improved radiosonde which utilizes the aerodynamic forces acting thereon to generate a spinning motion. A pair of inclined flat surfaces extend outwardly from the sidewalls of the radiosonde in such a way as to cause it to rotate while being dragged through the air. A swivel joint is interposed in the line connecting the radiosonde to the balloon in order to allow the radiosonde to rotate without winding up the connecting line.

Above and in spaced relationship to one of the outwardly extending inclined flat surfaces there is positioned a plate element with downwardly extending side members to form a cavity through which the atmospheric air is caused to flow as the radiosonde is carried aloft. The interior walls of the cavity are blackened and the exterior walls are provided with a reflective surface so as to minimize the effect of solar radiation on the sensing element. The top of the cavity has a rounded edge in the form of a burble fence to prevent flow separation which occurs at sharp leading edges. The sensor element is positioned in the cavity at an optimum location to take advantage of the ventilation speed while at the same time preventing the solar effects and wall contamination from adversely influencing the humidity readings.

Accordingly, it is an object of the present invention to provide an improved radiosonde which produces a more accurate measurement of the relative humidity of the ambient atmosphere.

Another object of the invention is to provide a radiosonde which rotates during its ascension phase causing an increased flow of air to pass over the humidity sensor thereby increasing the heat transfer and mass transfer coefficients.

Still another object of the invention is to provide a radiosonde having a pair of aerodynamic elements attached to opposite sides thereof which produce a spinning motion as the radiosonde ascends.

Another object of the invention is to provide an improved radiosonde wherein a humidity measuring sensor is positioned in a cavity attached to one of a pair of aerodynamic elements on the radiosonde. The unique location of the sensor provides for both an increased and a more stable flow of air thereover to produce a more accurate reading.

A still further object of the invention is to provide a radiosonde which rotates as it ascends allowing a degree of control over the direction of flow of air over a humidity sensor located in a cavity attached to an aerodynamic element located on the sidewall of the radiosonde and increasing the ventilation rate while providing a more stable air flow.

Another still further object of the invention is to provide a radiosonde having a humidity sensor in a cavity in an aerodynamic element wherein the top of the inlet opening of the cavity includes a burble fence to reduce the flow separations which normally occur at sharp leading edges.

These and other objects, features and advantages will become more apparent after considering the following description taken in conjunction with the annexed drawings and appended claims.

DESCRIPTION OF THE DRAWINGS

FIG. 1 is a view in perspective of an improved radiosonde including aerodynamic elements attached thereto according to the invention; and FIG. 2 is an enlarged side view of one of the aerodynamic elements showing the cavity positioned thereon for containing the humidity sensor and showing the direction of airflow and the burble fence.

DESCRIPTION OF A PREFERRED EMBODIMENT

Referring now to the drawings, there is shown a radiosonde designated generally by the reference numeral 13 which includes the main package in the form of a rectangular box 15. A top cover 17 having a slot 19 is shown to indicate the location of the intake for the prior art system for measuring the relative humidity. The data is transmitted back to the ground by the transmitter 21.

An outrigger 23 is hinged to the top cover 17 and includes a thermistor element 25. A harness 27 is attached to the box 15 serving to support the radiosonde during its upward journey to the upper atmosphere. A ring 29 is slidably positioned on the harness 27 and a swivel snap 31 is interposed between the balloon line 33 and the ring 29. The swirl snap 31 allows the radiosonde 13 to rotate on its longitudinal axis without causing the line 33 to become twisted.

The present invention is concerned with providing the means for causing the radiosonde 13 to rotate during its ascent. A pair of aerodynamic elements 35 and 37 are attached to opposite sides of the radiosonde 13. The elements 35 and 37 which include flat upper surfaces, extend outwardly from the sides of the box 15 and are angularly disposed in relationship thereto. In effect, the elements 35 and 37 are inclined in such a manner that the radiosonde 13 rotates or spins as it is dragged upward through the air by the line 33 attached to the rising balloon (not shown).

The aerodynamic element 37 is provided with a plate element 39 positioned above and in spaced relation to the upper surface thereof. A cavity 41 is created when side walls are added between the plate 39 and the upper surface of element 37. The airflow (shown in FIG. 2) which passes through the cavity 41 as the radiosonde 13 spins through the air during ascent, impinges on the humidity sensor 43 and gives an accurate indication of the condition of the atmosphere at that point. A burble fence 45 is positioned across the leading edge of the plate 39 at the upper front edge of the cavity 41 for the purpose of preventing flow separation which would normally occur at sharp leading edges.

MODE OF OPERATION

In operation, the radiosonde 13 is attached to a balloon or other lifting vehicle (not shown) by means of the line 33 which may be a cord or other similar element. A ring 29 slidably attached to the harness 27 connects the line 33 to the radiosonde 13 through a swivel snap 31 which allows the radiosonde to rotate relative to the balloon without twisting the attachment line 33. As the radiosonde 13 rises, a downward stream of air acts on a pair of outwardly extending aerodynamic elements 35 and 37 to produce a spinning or rotating motion to the radiosonde 13. To the upper surface of the aerodynamic element 37 there is attached a plate element 39 with side members to form a cavity 41. Thus, as the spinning radiosonde 13 is dragged aloft, a positive flow of air is caused to flow along the upper surface of the element 37 and through the cavity 41. A humidity sensor 43 positioned in the central area of the cavity is affected by the airflow and produces a signal which corresponds to the instantaneous humidity conditions of the ambient air. The data obtained by the use of the hereinbefore described radiosonde are considerably more accurate and reliable than any obtainable using presently available equipment.

Since reliable humidity data are essential for accurate weather forecasting, the spinning radiosonde is a particularly significant improvement in the field of military operational requirements. Also, the hereinbefore described radiosonde is useful as a tool for research meterologists to better ascertain the degree of biased humidity error that has been introduced over the years into synoptic weather data and climatological information, gathered through the use of the presently known radiosonde design. This improved operation is accomplished by providing a measure of control over the direction and magnitude of airflow over the humidity element which increases the heat transfer and mass transfer coefficients thereby decreasing the errors in humidity measurement. An increased ventilation rate as well as an uncontaminated air sample is provided by the unique spinning movement of the radiosonde during ascent and by positioning the sensor in a cavity on one of the aerodynamic elements.

Although the invention has been illustrated in the accompanying drawings and described in the foregoing specification in terms of a preferred embodiment thereof, the invention is not limited to this embodiment or to the particular configuration mentioned. It will be apparent to those skilled in the art that other elements for the acquisition of data may be attached to the unique aerodynamic elements of the radiosonde for the purpose of improving the accuracy and reliability of the readings obtained during the flight of the radiosonde. Also, the angular orientation of the aerodynamic elements and the length they extend from the radiosonde may be varied to affect the speed of rotation and, consequently, the ventilation rate over the sensing element.

Having thus set forth and disclosed the nature of our invention, what we claim and desire to secure by Letters Patent of the United States is:

1. In a radiosonde with measuring instruments contained in a box having side members, transmitting means extending from the bottom of said box for sending signals to earth, and a harness fixedly attached to opposite sides of said box for connecting a line from a balloon to lift said radiosonde into the upper atmosphere; the improvement comprising, a pair of oppositely disposed aerodynamic elements extending outwardly from the side members of said box, said aerodynamic elements being angularly oriented to said box and having flat upper surfaces over which air flows to cause the box to spin as it ascends into the upper atmosphere, a plate element positioned above and in spaced relation to one of said aerodynamic elements, said plate element having side members extending downwardly therefrom to the upper surface of said aerodynamic element to form a cavity, and a humidity measuring means positioned in said cavity such that the increased airflow passing over the surface of the aerodynamic element as the spinning radiosonde ascends is caused to pass through the cavity and impinge on said humidity measuring means thereby giving an accurate indication of the relative humidity at any given time and altitude.

2. The improved radiosonde configuration defined in claim 1 wherein a burble fence is positioned upwardly across the leading edge of said plate element at the upper front edge of the cavity on said aerodynamic element, said burble fence operating to prevent flow separation during passage of the airflow through the cavity.

3. The improved radiosonde configuration defined in claim 1 wherein said humidity measuring means is attached to the bottom surface of the plate element and extends downwardly into the cavity thereby permitting the increased airflow to impinge on the humidity measuring means while preventing solar effects from adversely influencing the readings.

4. The improved radiosonde configuration defined in claim 1 wherein a ring is slidably positioned on said harness, and a swivel snap is interposed between said ring and the line from the balloon thereby allowing the radiosonde to rotate on its longitudinal axis without causing the line to become twisted.

* * * * *